UNITED STATES PATENT OFFICE 2,653,954

MANUFACTURE OF 1-AMINO-4-HYDROXY-ANTHRAQUINONE

Viktor Weinmayr, Pitman, N. J., assignor to E. I. du Pont de Nemours and Company, Wilmington, Del., a corporation of Delaware No Drawing. Application May 3, 1950, Serial No. 159,853

2 Claims. (Cl. 260—380)

This invention relates to an improved process for the preparation of 1-amino-4-hydroxyanthraquinone, and more particularly to a method for preparing it from 1-nitroanthraquinone by catalytic hydrogenation procedure.

While various methods have been described for the preparation of 1-amino-4-hydroxyanthraquinone, which is a valuable intermediate for use in the manufacture of dyes, all of the known processes are complicated and usually require intermediates which are not readily available.

It is an object of the present invention to provide a method for the preparation of 1-amino-4-hydroxyanthraquinone directly from 1-nitroanthraquinone by simple and economical procedure, making the 1-amino-4-hydroxyanthraquinone readily available for use as a dye or as an intermediate in the preparation of other dyes.

I have found that 1-nitroanthraquinone can be directly reduced and converted to 1-amino-4-hydroxyanthraquinone by a catalytic hydrogenation process if it is carried out in sulfuric acid of from 85% to 100% strength, under slight hydrogen pressure and at temperatures of from 60° to 125° C. and preferably at temperatures of from 90° to 110° C., and in the presence of a hydrogenation catalyst which retains its activity in strong sulfuric acid.

While it is known that anthraquinone can be readily hydrogenated apparently because of the presence of reactive carbonyl groups in the molecule—see Bayer, Berichte 58, 2667 (1925)—and Skita, Berichte 58, 2685 (1925) has investigated the hydrogenation of anthraquinones in the presence of strong acids, particularly hydrochloric acid, in which the hydrogenation of the anthraquinone apparently proceeds with greater ease, the hydrogenations described in these processes introduce hydrogen directly into the benzene rings, forming octahydroanthraquinones from anthraquinone and octahydro-2-aminoanthraquinone from 2-aminoanthraquinone. In none of these cases was there any indication that a hydroxyanthraquinone was formed. In other cases, dinitroanthraquinones and nitrohydroxyanthraquinones have been reduced in sulfuric acid, sometimes in the presence of metals. See, for instance, U. S. Patent 2,118,445.

No disclosure, however, has been found of the hydrogenation of a 1-nitroanthraquinone compound to produce the 1-amino-4-hydroxyanthraquinone, and, while it is known that nitrobenzene and alpha-nitronaphthalene can be catalytically reduced to aminohydroxy compounds, it is not apparent from the reaction of these compounds, which do not contain the reactive carbonyl groups, that the course of the hydrogenation of anthraquinone compounds could be changed to give 1-amino-4-hydroxyanthraquinones, for, as illustrated in the articles above mentioned, the catalytic hydrogenation of anthraquinones under previously employed conditions hydrogenates the rings of the anthraquinone molecule, giving distinctly different types of compounds than are obtained from the benzene or naphthalene compounds.

I have found that the hydrogenation of 1-nitroanthraquinone to produce 1-amino-4-hydroxyanthraquinone must be carried out in sulfuric acid of at least 85% strength and preferably in from 90% to 100% sulfuric acid. The common concentrated acid of industry, namely, approximately 96% sulfuric acid, has been found to work very satisfactorily in this process. The hydrogenation is preferably carried out at a hydrogen pressure of from 20 to 50 pounds per square inch gauge at temperatures of from 90° to 110° C. Temperatures as low as 60° and as high as 125° C. may also be employed, as will be further illustrated.

Sulfuric acid of strength lower than 85% gives substantially reduced yields of the 1-amino-4-hydroxyanthraquinone, and at hydrogen pressures below 20 pounds per square inch the reaction becomes uneconomically slow. Pressures as high as 200 pounds, however, may be employed without interfering with the operability of the process. Hydrogenation under the conditions as above set forth at temperatures of below 60° C. become so slow that it is not of practical interest, while at temperatures as high as 125° C. very satisfactory results may be obtained. Higher temperatures may of course be employed, although at extremely high temperatures control of the reaction becomes difficult.

The usual platinum or palladium hydrogenation catalysts are suitable for carrying out this reaction. They may be employed in the forms technically available for use as hydrogenation catalysts, either as the free metals or metal oxides precipitated on appropriate carriers such as carbon black, etc.

The following examples are given to illustrate the invention. The parts used are by weight, unless otherwise designated.

Example 1

An autoclave suitable for hydrogenations is charged with 875 parts by weight of 96% sulfuric acid, 118.6 parts by weight of crude 1-nitroanthraquinone and 10 parts by weight of palladium catalyst (3% palladium on a carbon carrier prepared by the procedure outlined in U. S. Patent 2,285,277). The autoclave is evacuated and charged with hydrogen several times to completely displace the air. The charge is then heated with good agitation to from 80° to 90° C. and hydrogenated, using a hydrogen pressure varying from 20 to 50 pounds gauge pressure. The hydrogenation is continued until no pressure drop occurs. This requires about five hours and the hydrogen consumption corresponds very closely to that theoretically required. The charge is then cooled to about 50° C. and discharged onto an acid-proof filter to remove the catalyst. The autoclave and the catalyst are washed with about 100 parts of 96% sulfuric acid and the wash is combined with the main sulfuric acid filtrate. The filter cake is kept for the recovery of the palladium.

The sulfuric acid solution of the reaction product is poured into 12000 parts of water and the 1-amino-4-hydroxyanthraquinone is thus precipitated. The product is filtered, washed until acid-free with cold water, and dried.

One hundred (100) parts of crude 1-amino-4-hydroxyanthraquinone are thus obtained, equal to a yield of 89% of theory. The product contains 5.88% nitrogen. On sulfuric acid recrystallization a 45% yield, based on 1-nitroanthraquinone, of a quite pure 1-amino-4-hydroxyanthraquinone is obtained.

Similar results are obtained from a similar run carried out at 125° C. in 95% sulfuric acid. In 85% sulfuric acid at a temperature of from 80° to 90° C., an overall yield of about 13% of theory of acid recrystallized material is produced.

*Example 2*

Using the procedure of Example 1 but employing temperatures of from 60° to 80° C. and 200 pounds per square inch hydrogen pressure in 96% sulfuric acid, a yield of crude 1-amino-4-hydroxyanthraquinone somewhat lower than 89% is obtained, but of a quality quite satisfactory for general use.

The crude 1-amino-4-hydroxyanthraquinone obtained from each of the processes above outlined is suitable for use as a dyestuff as obtained, but may be further processed to give dyeings of greater brightness by extracting impurities with dilute aqueous caustic. The 1-amino-4-hydroxyanthraquinone is only very sparingly soluble in dilute alkali while some of the impurities are very soluble and can be removed conveniently by this method, if desired. The crude product may be further purified by a crystallization from strong sulfuric acid in the manner well known and practiced in anthraquinone color processing. If desired, a combination of both steps may be used.

The 1-amino-4-hydroxyanthraquinone obtainable by the processes as above illustrated is suitable for use as dyestuffs particularly in the dyeing of cellulose acetate, nylon, etc., although it may be further processed or purified to give dyeings of even greater brightness such as by extracting certain of the impurities remaining therein with dilute aqueous caustic. The product obtained directly by the processes above illustrated, or after further purification, may be employed as dispersed colors in the dyeing of acetate silk or other fibers having affinity therefor, which are dyed in attractive bluish-red shades. The 1-amino-4-hydroxyanthraquinone is also useful as a dye intermediate in the preparation of other dyes.

The hydrogenation of the 1-aminoanthraquinone by the processes above described appears to be limited to the use of sulfuric acid, for attempts to carry out the same hydrogenation in hydrogen fluoride and in 85% phosphoric acid do not give the same results. Hydrogenation in hydrogen fluoride apparently leads only to 1-aminoanthraquinone, while hydrogenation in phosphoric acid given only undesirable tars.

Of the well-known and readily available hydrogenation catalysts, the platinum and palladium catalysts as ordinarily prepared for use in hydrogenation processes are the only ones which have been found to give the 1-amino-4-hydroxyanthraquinone in the desired yields and purity.

I claim:

1. A process for preparing 1-amino-4-hydroxyanthraquinone from 1-nitroanthraquinone which comprises hydrogenating 1-nitroanthraquinone in sulfuric acid of from 85% to 100% strength at temperatures of from 60° to 125° C. under a hydrogen pressure of from 20 to 200 pounds per square inch gauge pressure and in the presence of a hydrogenation catalyst of the class consisting of platinum and palladium catalysts.

2. A process for preparing 1-amino-4-hydroxyanthraquinone from 1-nitroanthraquinone which comprises hydrogenating 1-nitroanthraquinone in sulfuric acid of from 90% to 100% strength at temperatures of from 90° to 110° C. under a hydrogen pressure of from 20 to 50 pounds per square inch gauge pressure and in the presence of a hydrogenation catalyst of the class consisting of platinum and palladium catalysts.

VIKTOR WEINMAYR.

References Cited in the file of this patent

UNITED STATES PATENTS

| Number | Name | Date |
|---|---|---|
| 1,930,352 | Bamberger | Oct. 10, 1933 |
| 1,957,920 | Whelen | May 8, 1934 |
| 2,228,885 | Olpin | Jan. 14, 1941 |

OTHER REFERENCES

Schmidt et al., Ber. vol. 29, part III, page 2943 (1936).